US010663850B2

(12) United States Patent
Harrison

(10) Patent No.: US 10,663,850 B2
(45) Date of Patent: May 26, 2020

(54) PROJECTION SCREEN

(71) Applicant: Harkness Screens International Limited, Dublin (IE)

(72) Inventor: David Harrison, Welwyn Garden City (GB)

(73) Assignee: Harkness Screens International Limited, Dublin (IE)

(*) Notice: Subject to any disclaimer, the term of this patent is extended or adjusted under 35 U.S.C. 154(b) by 0 days.

(21) Appl. No.: 15/749,546

(22) PCT Filed: Aug. 5, 2016

(86) PCT No.: PCT/EP2016/068819
§ 371 (c)(1),
(2) Date: Feb. 1, 2018

(87) PCT Pub. No.: WO2017/021551
PCT Pub. Date: Feb. 9, 2017

(65) Prior Publication Data
US 2018/0224734 A1  Aug. 9, 2018

(30) Foreign Application Priority Data
Aug. 5, 2015 (GB) .................................. 1513865.4

(51) Int. Cl.
G03B 21/56 (2006.01)
G03B 21/60 (2014.01)
G03B 21/20 (2006.01)
G03B 21/604 (2014.01)

(52) U.S. Cl.
CPC ............. *G03B 21/56* (2013.01); *G03B 21/60* (2013.01); *G03B 21/2033* (2013.01); *G03B 21/604* (2013.01)

(58) Field of Classification Search
CPC .............................. G03B 21/60; G03B 21/604
USPC .......................................................... 359/452
See application file for complete search history.

(56) References Cited

U.S. PATENT DOCUMENTS

| 4,190,320 A | | 2/1980 | Ferro | |
| 5,361,163 A | * | 11/1994 | Matsuda | G03B 21/60 264/1.9 |
| 5,456,967 A | * | 10/1995 | Nezu | G03B 21/56 359/452 |
| 5,473,469 A | * | 12/1995 | Magocs | G03B 21/602 359/449 |
| 6,144,491 A | * | 11/2000 | Orikasa | G03B 21/60 359/452 |
| 6,404,548 B1 | * | 6/2002 | Tatsuki | G03B 21/60 359/443 |
| 7,063,872 B1 | * | 6/2006 | Amimori | G02B 5/0226 353/32 |

(Continued)

FOREIGN PATENT DOCUMENTS

| JP | S58-52628 U | 4/1983 |
| WO | WO 2013/095967 A1 | 6/2013 |
| WO | WO 2014/172108 A1 | 10/2014 |

*Primary Examiner* — Christopher E Mahoney
(74) *Attorney, Agent, or Firm* — Blank Rome LLP

(57) ABSTRACT

A projection screen comprising a polymer layer (250) comprising a front side (250a) that faces incoming incident light generated from a projector (110), incorporating a plurality of diffusing particles distributed throughout the polymer layer (250) and a first rear reflective layer (280) arranged on a back side of the polymer layer opposite to the front side.

19 Claims, 8 Drawing Sheets

(56) References Cited

U.S. PATENT DOCUMENTS

| | | |
|---|---|---|
| 8,115,997 B1 | 2/2012 | Chien |
| 8,348,440 B2 * | 1/2013 | Burggraf ................ G03B 21/26 353/122 |
| 8,687,272 B1 | 4/2014 | Lippey et al. |
| 9,041,691 B1 * | 5/2015 | Haskin .................. G06F 3/0421 345/175 |
| 2002/0051290 A1 * | 5/2002 | Hannington ........... G03B 21/60 359/452 |
| 2007/0206281 A1 | 9/2007 | Teng |
| 2008/0062517 A1 * | 3/2008 | Seki ....................... G03B 21/62 359/452 |

* cited by examiner

PROJECTION SCREEN

FIELD

The invention relates to a projection screen. In particular, but without limitation, this disclosure relates to a front projection screen that minimises laser speckle in laser projection systems.

BACKGROUND

Laser projection systems offer significant advantages over conventional lamp-based systems. For example, compared with conventional Xenon lamp projectors, laser projectors display videos and still images on to a projection screen with better contrast, colour gamut, uniformity, and brightness. In this way, cinema-goers are provided with an enhanced visual experience. However, one problem faced with front projection laser systems is the formation of laser speckle in the image observed by the viewer. Laser speckle is a consequence of the high spatial and temporal coherence of the laser light and occurs due to the interference of coherent laser light that is reflected from the projection screen. To a viewer looking at the front projection screen, the result is a granular image comprising bright and dark regions of light called a speckle pattern. The bright regions generally correspond to regions where the reflected light rays have constructively interfered, and the dark regions generally correspond to regions where the reflected light rays have de-constructively interfered. This speckle pattern varies depending on the viewing angle between the viewer and projection screen and its presence adds undesirable noise to the image.

The level of speckle can be quantified by the speckle contrast ratio. Most methods of speckle contrast reduction are based on generating different speckle patterns, so that the different speckle patterns average out in the eye of the viewer. Different speckle patterns can be produced by varying the illumination angle, polarisation and wavelength of the illuminating laser beam.

SUMMARY

Aspects and features of an invention are set out in the claims.

BRIEF DESCRIPTION OF THE DRAWINGS

Examples of the present disclosure will now be described with reference to the accompanying drawings in which.

DETAILED DESCRIPTION

Figure 1:
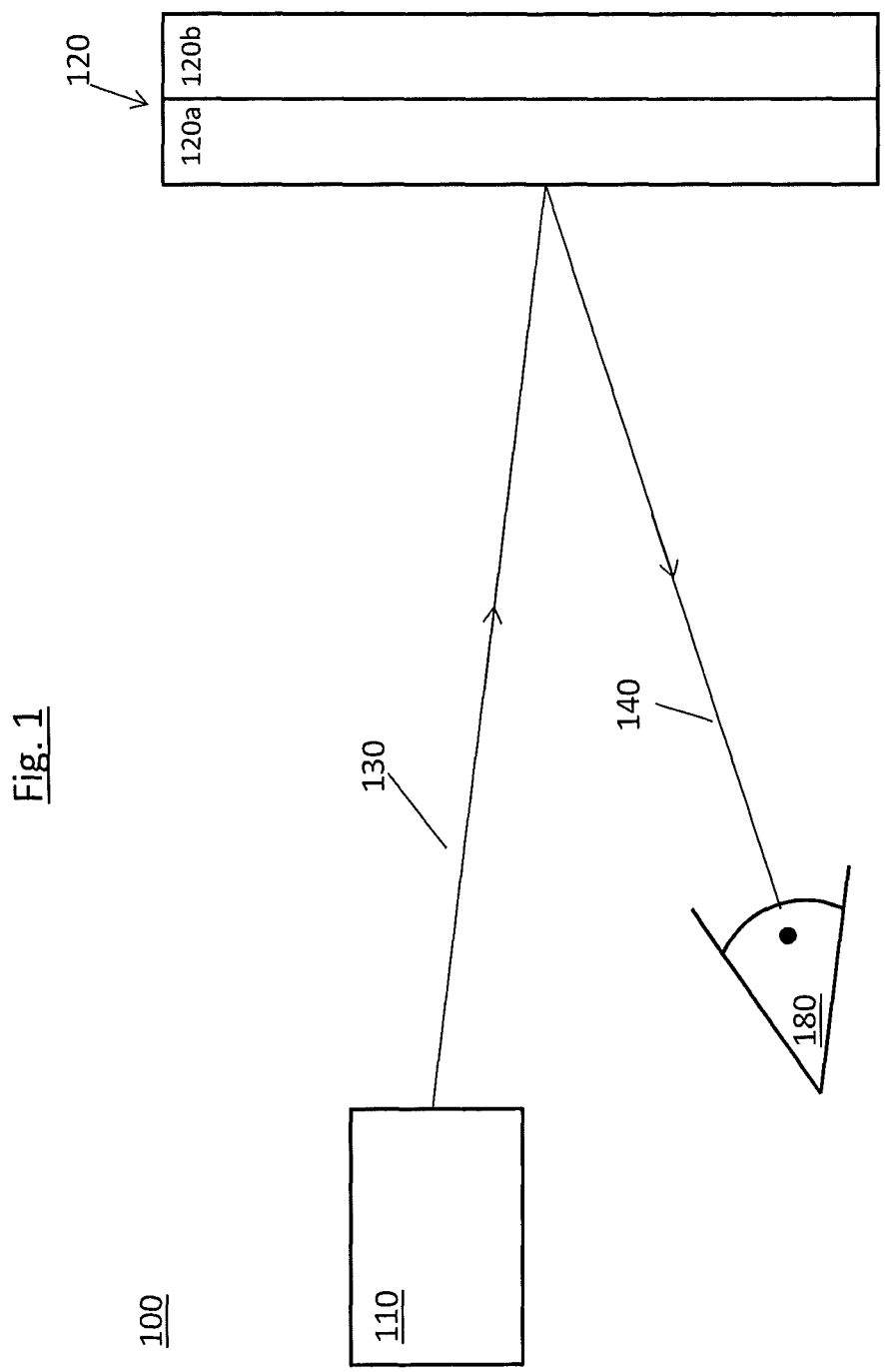
FIG. 1 illustrates in side view an example of a front projection system.

As is known in the art, interference effects such as laser speckle are a manifestation of the coherence between light waves at different points in space (spatial coherence) and different instants of time (temporal coherence). Associated with temporal coherence is the coherence time which is the time delay between waves over which correlations of the properties of the waves are maintained and interference effects can be seen. At longer delay times the light properties become de-correlated. Related to the coherence time, through the speed of light, is the coherence length, the distance over which correlations are maintained. That is, for example, for two light beams, the path length difference over which the light can exhibit interference effects such as speckle.

The present disclosure aims to provide a front projection screen arranged to reduce laser speckle contrast by diffusing light from a projector as it propagates through the projection screen. Diffusing the light by multiple scatterings within the projection screen, and in particular a polymer layer of the projection screen, increases the range of path-lengths or equivalently time delays of the light within the projection screen. If the distribution of path-lengths of light propagating towards the viewer is made larger than the coherence length of the light, speckle effects can be reduced. In this way, the inventors have provided a front projection screen to increase the interaction length of light in the screen and thereby reduce the laser speckle effect.

For simplicity and clarity of illustration, reference numerals may be repeated among the figures to indicate corresponding or analogous elements.

FIG. 1 illustrates an example of a front projection system 100. The system comprises a projector 110, for example a laser projector emitting visible light, and a front projection screen 120. The projector is arranged to project light 130 representative of the image on to the projection screen. During operation, incoming light 130 from the projector falls incident on the front projection screen and is reflected 140 towards a viewer 180. The viewer 180 is positioned in front of the projection screen 120 and receives the reflected light 140 from the projector screen to view the image.

Figure 3:
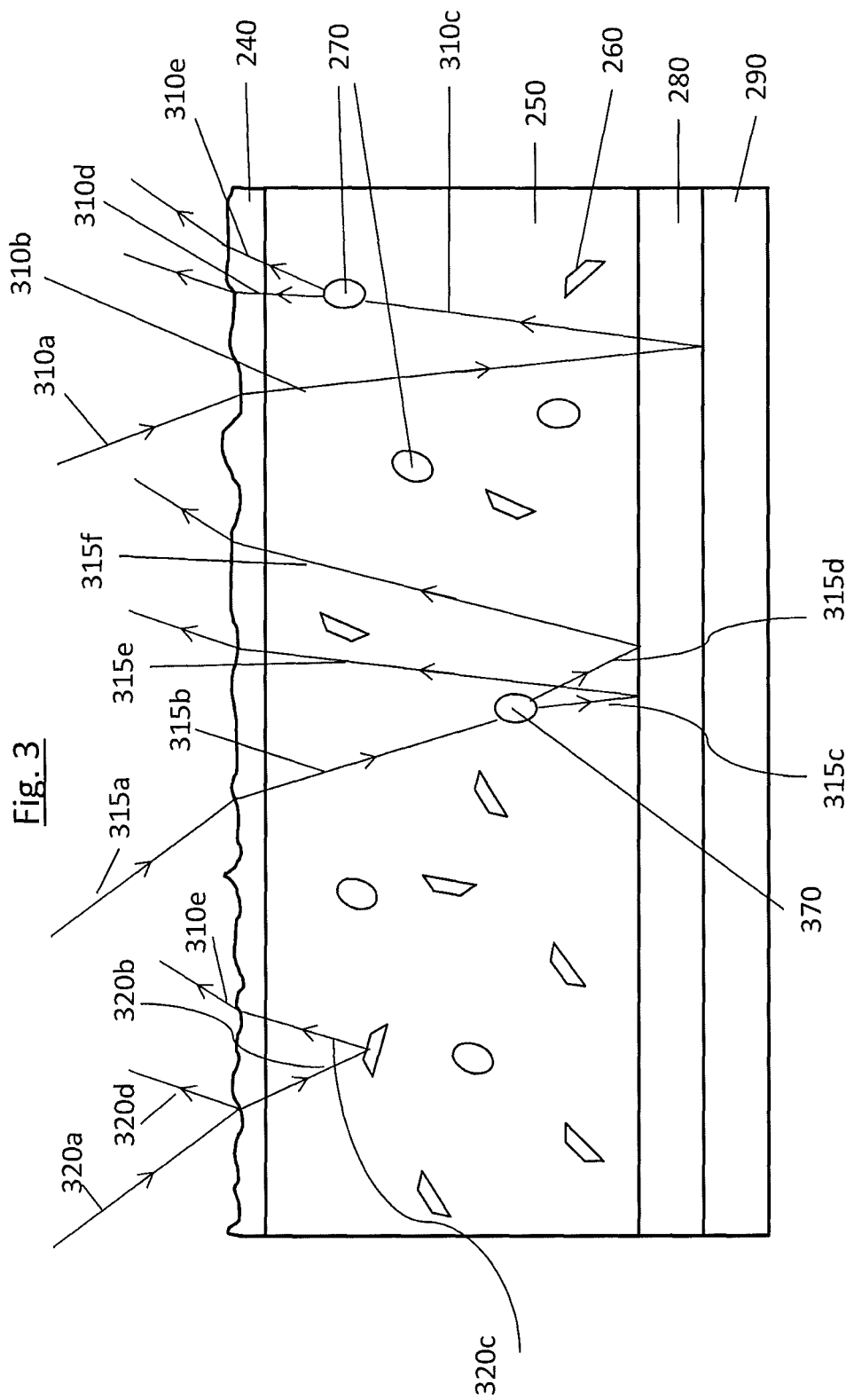
FIG. 3 illustrates an aspect of the projection screen of FIG. 2 wherein incident light may propagate within the projection screen via various different paths.
Figure 4:
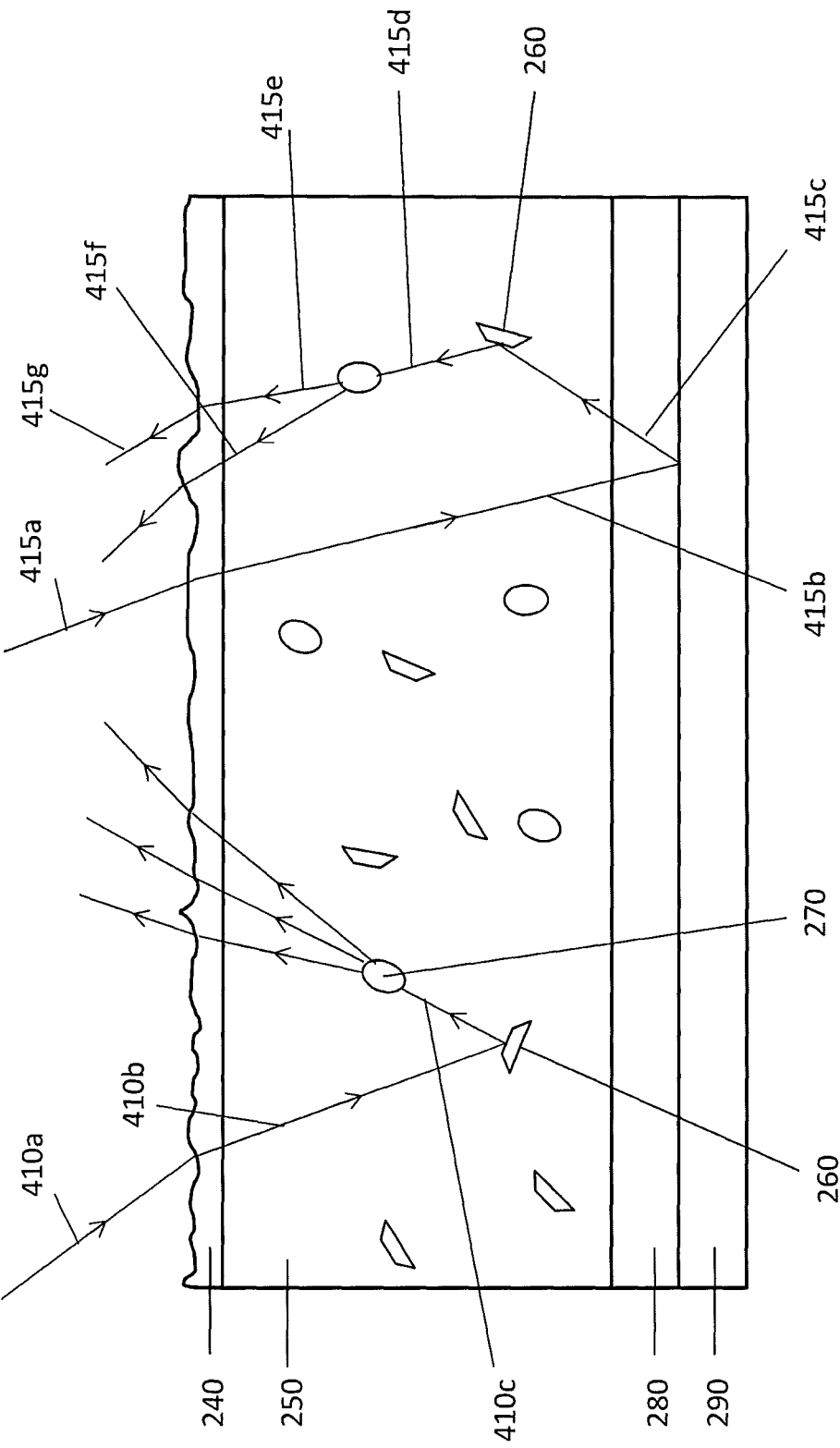
FIG. 4 illustrates a further aspect of the projection screen of FIG. 2 wherein incident light may propagate within the projection screen via various different paths.
Figure 5:
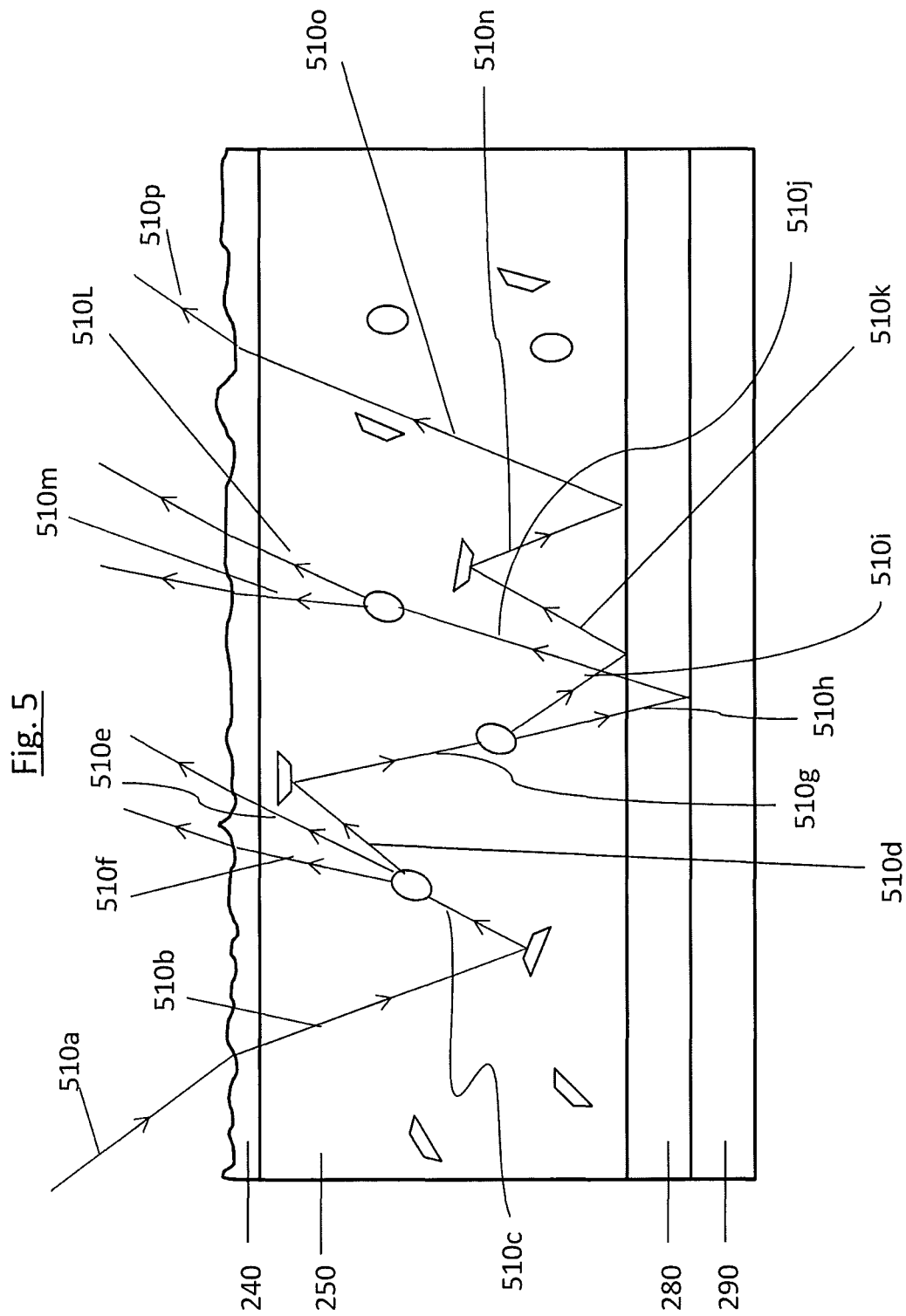
FIG. 5 illustrates a further aspect of the projection screen of FIG. 2 wherein incident light may propagate within the projection screen via various different paths.

For clarity of explanation, light travelling in the forward direction (e.g. rays 310a and 310b in FIG. 3) is defined as light that is generally heading from the projector onto the projection screen. Light travelling in the backward direction (e.g. rays (310c, 315e, 315f, 320c, 410c, 415c, 415d, 415e, 415f, 510c, 510d-f, 510j-k, 510l-m and 510o)) is defined as light that is heading generally towards the viewer.

Figure 2:
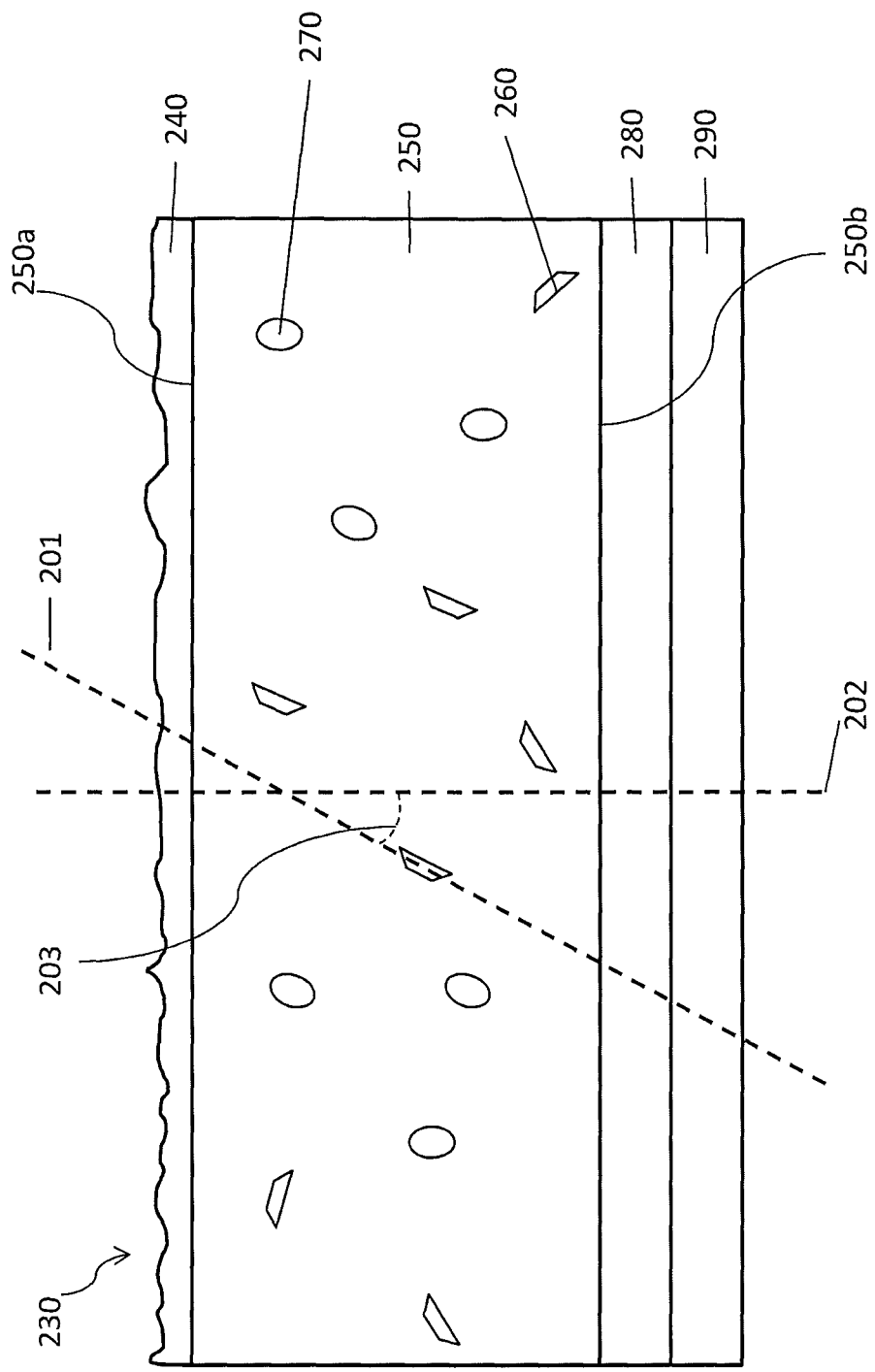
FIG. 2 illustrates a cross sectional view of a front projection screen according to the present disclosure.

FIG. 2 shows a cross-sectional view of a multi-layer front projection screen 230. The projection screen comprises a polymer layer 250, and preferably, a first rear reflective layer 280.

Optionally, the polymer layer of the front projection screen may also comprise a plurality of diffusing particles incorporated within the polymer layer. Additionally or alternatively, the polymer layer may also comprise a plurality of reflecting particles incorporated into the polymer layer.

Further optionally or alternatively, the projection screen may comprise a surface-diffusion layer arranged on the front side of the polymer layer that faces oncoming incident light generated from the projector.

In addition or alternatively, the front projection screen may comprise a second rear reflecting layer arranged on top of the first rear reflective layer.

The polymer layer, diffusing particles, reflecting particles, first and second rear reflective layers, and surface-diffusion layer are each arranged to increase the interaction length of light from the projector with the projection screen. In this way, each of these components provide a de-speckling effect and/or contribute to the de-speckling mechanism. As will be described below, any one of these components can work together to enhance the de-speckling effect that they each provide and/or enhance the de-speckling mechanism. That is, each one of these components can work in combination to increase the range of path-lengths that an incident ray of light may take within the projection screen. In this way each one of these components can work in combination to increase the interaction length of incident light with the projection screen more than they would individually. Alternatively any one or a subset of the mechanisms may be employed to achieve the effect.

Advantageously, there is also provided an arrangement wherein a backing substrate, such as a white PVC backing substrate, is not required. This is in contrast to conventional projection screens wherein a thin front reflective layer (e.g. 120a) is formed onto a white PVC backing substrate (e.g. 120b). In such arrangements, the white PVC backing substrate functions as a structure for mounting the projection screen onto a steel framework in a cinema. The projection screen arrangements of the present disclosure do not require a backing substrate. In these ways, all parts of the projection screen contribute to optical performance and the polymer layer provides structural integrity for mounting the screen onto a steel framework whilst also contributing to speckle reduction.

Polymer Layer

In an example, the polymer layer comprises a plurality of diffusing particles 270 incorporated within and held in place by the polymer layer 250. The diffusing particles 270 are distributed throughout the polymer layer 250 and, optionally evenly distributed. In examples, the polymer layer and diffusive particles together form a volume diffuser.

During operation, incident light travelling through the polymer layer (e.g. light ray 310b, 315b, 320b) may fall incident on one or more diffusive particles (e.g. light ray 315b) that are embedded within the polymer layer 250. At least a portion of incident light on a diffusive particle will be diffusively transmitted, and/or diffusely scattered, and thereby re-directed over a range of directions (e.g. light rays 310d, 310e, 315c and 315d). In this way, and consequent of the volume diffusion provided by the diffusive particles, the path length of light within the polymer layer is advantageously increased. Furthermore, and advantageously, light may emerge from the screen at different angles.

In a further example, the polymer layer 250 may comprise a plurality of reflective particles 260 incorporated within, and held in place, by the polymer layer 250, possibly in addition to the diffusing particles 270. The reflecting particles 260 are distributed throughout the polymer layer 250 and, optionally, evenly distributed and/or tilted partially randomly. Light travelling through the polymer layer 250 may fall incident on, and be reflected by one or more reflecting particles (e.g. light rays 320b, 410b, 510b, 510d, and 510k).

In examples, reflected light from the reflecting particles may fall incident on one or more other reflecting particles and/or one or more diffusing particles (e.g. light rays 410c, 415d, 510c, and 510d). In this way, light propagating through the polymer layer may be reflected and diffused multiple times to advantageously increase the path length of light within the polymer layer (e.g. light ray path 510 a-o). That is, the optical path through the polymer layer may be distorted as a result of having one or more reflecting particles and/or diffusive particles incorporated within the polymer layer.

As such, incorporating the reflective particles with the diffusing particles 270 within the polymer layer further increases the path length taken by an incident ray of light travelling through the polymer layer 250. That is, compared to a polymer layer 250 without diffusing and/or reflecting particles 260, the interaction length of a ray of light with the projection screen is enhanced by reflecting and diffusing the ray of light multiple times using the reflecting and diffusing particles 270.

The polymer layer 250 may be a clear calendered PVC polymer with 10 to 60 parts plasticiser. A clear polymer means that it contains no dye or pigment. The plasticiser advantageously makes a screen flexible and may have a different refractive index to the PVC to further distort the light path. During fabrication, the clear PVC polymer layer 250 produces a substrate with flexibility and elastic stretch such that, for example, it can be stretched flat onto a cinema frame to form a cinema screen.

The diffusing particles 270 and/or reflecting particles may be incorporated into the polymer layer 250 during calendering of the polymer layer 250. For example, the diffusing particles 270 and/or reflecting particles 260 may be suspended into the polymer layer 250 during formulation mixing.

As the process of calendering stretches and extrudes the polymer, it has been found that the diffusing particles and/or reflecting particles tend to generally orientate themselves into the plane of flow. In this way, the diffusing particles and/or reflecting particles become evenly distributed within the polymer layer. Furthermore, the reflecting particles may become generally tilted, or rather orientated, with their reflecting surface parallel to the polymer surface. Accordingly, the calendering process provides control of the distribution and orientation of the diffusive and reflective particles.

In an example, the thickness of the polymer layer is 0.05 mm to 3.00 mm, with or without reflecting and/or diffusing particles.

The diffusing particles 270 may be formed of: Barium Sulphate; Antimony Trioxide; Aluminium Trihydrate; Titanium Dioxide; Calcium Carbonate; and/or Magnesium Carbonate.

The reflecting particles 260 may be formed of pearlescent flakes. Advantageously, pearlescent flakes depolarise light upon reflection thereby creating polarisation diversity to further reduce speckle. Additionally, because pearlescent flakes have partial opacity, they will transmit a portion of incident light. This is advantageous because the transmitted light may subsequently interact with other diffusing and/or reflecting particles 260 to further reduce speckle.

Additionally or alternatively, the reflecting particles 260 may comprise aluminium flakes. Aluminium flakes maintain light polarisation and would be used for 3D systems that rely upon polarisation separation between left and right eyes. As a further possibility, the aluminium flakes may be coated with Silicon Dioxide ($SiO_2$) or Magnesium Fluoride ($MgF_2$) to advantageously reduce oxidation and act as a fire retardant layer. Oxidation prevention of the aluminium flake is necessary to prevent hydrogen production in the presence of water.

Preferably, the reflective and diffusive particles comprise a combined percentage by weight of 0% to 10% with respect to the weight of the polymer layer 250.

In examples, the diameters of the diffusing particles are between 100 nanometres to 1000 nanometres. The diameters of the reflecting particles are between 10 micrometres to 100 micrometres.

As one possibility, the polymer layer 250 is formed of a material which has an inherent volume diffusive property due to diffusive scattering from scattering centres such as, for example, constituent materials of the polymer layer, voids, or other natural inhomogeneities. Such diffusive scattering will also diffuse light and, accordingly, light propagating through the polymer may also be diffused by one or more scattering centres present within the polymer material. In the art these polymers may be referred to as volume diffusers. If one or more diffusive particles are added to the volume diffusive polymer, light propagating through the volume diffusive polymer may be further diffused by the diffusive particles.

In an example, the polymer layer 250 may exhibit birefringent properties. A non-birefringent material is preferable for applications wherein the polarisation of incident light at the projection screen needs to be maintained such as in, for example, 3D projection systems.

Additionally or alternatively to the above examples, the reflecting and/or diffusing particles 270 may be replaced with a particle that has reflective and diffusive properties. In other words, they can be replaced with a particle that reflects a portion of incident light and diffusively transmits, and/or diffusely scatters, a portion of incident light.

As one possibility, to further reduce speckle, the light path of incident light through the polymer layer 250 may be extended by, for example, using a thicker polymer layer 250. However, advantageously with the examples disclosed herein, the diffusing and reflecting particles extend the light path of incident light through the polymer layer by diffusing and/or reflecting light multiple times through the polymer layer. In this way, the projection screen can be made thinner. Thinner screens are lighter, foldable and easier to fabricate. Furthermore, thinner screens require less material and therefore have less material cost.

First Rear Reflective Layer

As one possibility, a first rear reflective layer 280 is arranged on the back side 250*b* of the polymer layer 250, opposite to the front side 250*a*. The first rear reflective layer 280 may be partially reflective with a reflectance of less than 100% or, in other examples, 100% reflective. The first rear reflective layer 280 may also be referred to as a first rear reflector.

During operation, light transmitted through the polymer layer 250 will fall incident on the first rear reflective layer. The first rear reflective layer will reflect at least a portion of this incident light back through the polymer layer (e.g. 315*e*, 315*f*, 510*k*) in the backward direction. In this way, a portion of incident light on the rear reflective layer will pass through the polymer layer for at least one further time.

Light propagating through the polymer layer in the backward direction (e.g. 410*c*, 415*d*, 510*c*, 510*j*) may again fall incident on one or more of the diffusive particles (310*c*) and advantageously be further diffused (310*d*, 310*e*). Additionally, or alternatively, light propagating through the polymer layer in the backward direction may again fall incident on one or more of the reflecting particles and advantageously be reflected multiple times. In this way, backwardly propagating light through the polymer layer may be reflected and diffused multiple times to advantageously further increase the path length of light within the polymer layer.

Reflection from the reflective layers in combination with the diffusion and reflection from the diffusing and/or reflecting particles in the polymer layer determines the overall gain of the screen. Screen gain is a known measurement in the art and is the ratio of the luminance produced by a projected beam of white light incident normally on the screen and of the same beam falling normally on a unity gain reference standard with a Lambertian reflectance. The reflection from the surfaces is measured at a horizontal angle of 5° to the normal of the surface (see, for example, British Standard 5550-7.2.5:1980). Therefore, backward propagating light from the rear reflector (e.g. light ray path 510 *a-o*) may contribute to increasing the screen gain value of the projection screen.

Therefore, in examples, incident light on the projection screen is reflected and diffused multiple times en route to the viewer via the arrangement of the one or more reflecting particles in the polymer layer, one or more diffusing particles 270 in the polymer layer, and the first rear reflector. In this way, the path length of light within the projection screen is advantageously increased to reduce speckle.

During fabrication of the projection screen, the first rear reflective layer 280 may be spray coated onto the back side of the polymer layer 250 and subsequently cured.

As one possibility, the first rear reflective layer 280 may comprise a clear polymer resin having a different refractive index than the polymer layer 250. Additionally or alternatively, the first rear reflective layer 280 may comprise reflective particles such as, for example, pearlescent flakes and/or aluminium flakes. As one further possibility, the first rear reflective layer 280 may be a laminate of PVC incorporating pearlescent flakes that are heat bonded to the polymer layer 250 during calendering.

Optionally, the first rear reflective layer may be 15 micrometres to 40 micrometres thick, with or without reflective particles.

As one further possibility, the first rear reflective layer 280 may be arranged to provide greater specular reflectance than diffuse reflectance by reducing its surface roughness.

Second Rear Reflective Layer

In an example, a second rear reflective layer 290 is arranged on top of the first rear reflective layer 280 and may be 100% reflective, or at least more reflective than the first rear reflective layer 280.

During operation, the second rear reflective layer reflects incident light in the backward direction. That is, for example, the second rear reflective layer reflects any light which has been transmitted through the first rear reflective layer back through the first rear reflective layer and polymer layer.

Reflected light from the second rear reflective layer (e.g. 510*h*, 415*c*) which passes through the polymer layer in the backward direction may also be diffused by one or more diffusing particles 270 (e.g. 510j) and/or reflected by one or more reflecting particles. In this way, forwardly travelling light may be advantageously redirected back through the polymer layer to be reflected and diffused multiple times (e.g. light ray path 510 a-o). Furthermore, by reflecting light back, light loss out through the back of the projection screen is minimised and screen gain is increased.

During fabrication, the second rear reflective layer 290 may be coated on to the first rear reflective layer 280. As one possibility, the second rear reflective layer 290 may be a spray coated clear polymer resin incorporating reflective particles such as, for example, Titanium Dioxide. At percentage by weight above 0.5%, Titanium Dioxide enhances the reflective properties of the second rear reflective layer. For example, the incorporation of 0.5% Titanium Dioxide into the second rear reflective layer has been found to increase total reflectance, measured as the Total Integrated Scatter. Alternatively, the second rear reflective layer 290 may be a spray coated polymer resin incorporating white filler.

Optionally, the second rear reflective layer may be 15 micrometres to 40 micrometres thick.

As one further possibility, the second rear reflective layer 280 may be arranged to provide greater diffuse reflectance than specular reflectance.

In examples where the first rear reflective layer is arranged to provide specular reflectance, and the second rear reflective layer is arranged to provide diffuse reflectance, the screen gain value of the projection screen may be adjusted by changing the reflectance of the first rear reflective layer.

For example, by reducing the reflectance of the first rear reflective layer, more light will reach the second rear reflective layer and be diffusely reflected. Accordingly, light reflected from the rear reflectors, and subsequently emerging from the projection screen, will be more diffuse. Greater diffusion results in lower screen gain, but reduced speckle.

Conversely, by increasing the reflectance of the first rear reflective layer, less light will reach the second rear reflective layer and be diffusely reflected. Accordingly, light reflected from the rear reflectors, and subsequently emerging from the projection screen, will be less diffuse. Lower diffusion results in higher screen gain, but higher speckle.

In this way, the combination of the first and second rear reflective layers provides control over the screen gain and degree of speckle exhibited by the projection screen. Accordingly, the projection screen can be arranged to provide an optimum balance between screen gain and speckle.

Similarly, the screen gain value of the projection screen may be adjusted by changing the degree of specular reflectance provided by the first rear reflective layer and/or the degree of diffuse reflectance provided by the second rear reflective layer. That is, by increasing the degree of specular reflectance provided by the first rear reflective layer, light reflected from the rear reflectors, and subsequently emerging from the projection screen, will be less diffuse. In contrast, by increasing the degree of diffuse reflectance provided by the second rear reflective layer, light reflected from the rear reflectors, and subsequently emerging from the projection screen, will be more diffuse. In this way, the combination of the first and second rear reflective layers provides further control over the screen gain and degree of speckle exhibited by the projections screen.

Accordingly, the projection screen can be arranged to provide an optimum balance between screen gain and speckle by controlling the reflectance and degree of diffuse and/or specular reflectance provided by the first and/or second rear reflective layers.

The rear reflective layers may be arranged to provide greater diffuse reflectance than specular reflectance by, for example, increasing the roughness of the surface that faces incident light. Conversely, the degree of specular reflectance may be increased by smoothing the surface that faces incident light.

Surface-Diffusion Layer

The projection screen may also comprise a surface-diffusion layer 240 comprising a textured surface that is arranged on top of the polymer layer 250 as illustrated in FIG. 2.

Light incident on the surface-diffusion layer (e.g. 310a, 315a, 320a, 410a, 415a and 510a) undergoes surface diffusion and may be diffusively reflected (e.g. 320d) and/or diffusively transmitted (e.g. 310b, 315b, 320b, 320e, 410b, 415b, 415g, 510b, 510p). That is, for example, a portion of incident light generated from the projector may be diffusively reflected towards the viewer (320d) and a portion may be diffusively transmitted through the surface-diffusion layer 240 and fall incident on the front side of the underlying polymer layer (e.g. 310b, 315b, 320b, 410b, 415b and 510b).

Furthermore, a portion of light reflected by one or more reflective particles that is travelling in the backward direction may be diffusively transmitted through the surface-diffusion layer 240 and towards the viewer (e.g. 320e). Similarly, a portion of light reflected by the first and/or second rear reflective layer 290 that is travelling in the backward direction may be diffusively transmitted through the surface-diffusion layer 240 and towards the viewer (e.g. 510p). Similarly, a portion of light diffused by one or more diffusive particles that is travelling in the backward direction may be diffusively transmitted through the surface-diffusion layer 240 and towards the viewer (e.g. 415g)

Preferably, the surface-diffusion layer 240 may be embossed on the front side surface of the polymer layer 250 or formed by roughening the front side surface of the polymer layer 250.

An embossed surface-diffusion layer 240 may be formed onto the polymer layer 250 during calendering of the polymer film. For example, an emboss roller may emboss a fine matt finish, or rather fine textured finish, on to the surface of the polymer film whilst the polymer film is hot from the final calender bole.

In other examples, the surface-diffusion layer 240 may be a coating applied to the front side surface of the polymer layer 250.

In the above examples, the surface gloss of the surface-diffusion layer 240 is preferably less than 5%. Higher gloss surfaces may also be used, however, a balance needs to be struck because, for example, if the surface is made too glossy then the surface would provide more specular reflection. Increased specular reflection may result in an undesirable "hot spot". The inventors have found that a 5% gloss level is optimum for reducing speckle and reducing hot spots.

As can be understood from the foregoing, there is provided an arrangement wherein incident light on the polymer layer is any one or more of: light generated from the projector that is incident on the polymer layer for the first time (e.g. 320b, 315b, 310b, 410b, 415b, and 510b); diffused light from any one or more of the diffusing particles (e.g. 315c, 315d, 310d, 310e, 415e, 415f); and/or reflected light from the first and/or second rear reflective layer (e.g. 315*e*, 315*f*, 310*c*, 415*c*, 510*j*, 510*k*, 510*o*).

There is also provided an arrangement wherein incident light on the diffusive particle is any light propagating through the polymer layer 250. For example, incident light on the diffusive particle may be any one or more of diffused light from one or more other diffusing particles, reflected light from one or more reflecting particles (e.g. 410*c*, 415*d*, 510*c*, 510*g*, 710*d*') and/or reflected light from the first and/or second rear reflective layer (e.g. 310*c*, 415*c*, 510*j*, 610*e*', 710*e*').

There is also provided an arrangement wherein incident light on the reflecting particle is any light propagating through the polymer layer 250. For example, incident light on the reflective particle may be any one or more of: diffused light from one or more diffusing particles (e.g. 710*d*. 710*g*'); reflected light from one or more other reflecting particles, and/or reflected light from the first and/or second rear reflective layer (e.g. 415*c*, 510*k*).

Furthermore, there is also provided an arrangement wherein incident light on the first reflective layer is any light transmitted through the polymer layer 250. For example, incident light on the first reflective layer may be any one or more of: diffused light from one or more diffusing particles (e.g. 315*c*, 315*d*, 510*i*, 610*d*, 610*e*, 710*e*); reflected light from one or more reflective particles (e.g. 510*n*); and/or reflected light from the second rear reflective layer (e.g. 310*c*, 415*c*, 510*j*).

There is also provided an arrangement wherein incident light on the surface-diffusion layer is any one or more of: light generated from the projector that is incident on the diffusive surface for the first time (e.g. 310*a*, 315*a*, 320*a*, 410*a*, 415*a*, 510*a*); light transmitted through the polymer layer 250 in the backward direction; diffused light from one or more diffusing particles (e.g. 310*d-e*, 415*e-f*, 510*l-m*, 510*e-f*); reflected light from one or more reflecting particles (e.g. 320*c*), and/or reflected light from the first and/or second rear reflective layer (e.g. 315*e*, 315*f*, 510*o*).

In examples, the process for making a projection screen in accordance with the present disclosure comprises a calendering step, perforation step, seaming step, edge finishing step, and a coating step.

The calendering step comprises a process where the polymer formulation is mixed then extruded and milled. The precise mixing process requires a detailed temperature profile increase to ensure that the polymer and plasticiser and, if present, the diffuser particles and/or reflective particles, are thoroughly blended before entering the calender. The calender consists of four large cylinder rollers that use heat and pressure to produce film with precise thickness, surface uniformity and orientation of the formulation particles. On exiting the calender, the film may optionally be embossed with a designated surfacing cylinder that permanently embosses the film ensuring surface uniformity and fine textured front surface finish.

The perforation step comprises trimming the polymer film to a desired size and passing it through a perforation machine to perforate the polymer film with a predefined pattern of holes with specific spacing and hole size. Perforations allow sound, from speakers placed behind the finished screen, to travel through the holes thereby reducing sound attenuation that would otherwise occur with non-perforated film.

The seaming step comprises joining multiple polymer films together using radio frequency welding to form a larger sized screen.

The edge finishing step comprises cutting the welded screen to a desired size and RF welding a border that has three layers of polymer film with plastic eyelets at approximately 150 mm spacing.

The coating step may comprise the application of one or more reflective layers and, optionally, a surface-diffusion layer. The application of a reflective layer comprises stretching out the edge finished screen onto a frame within an environmentally controlled spray room. A robot that has controlled movement in X, Y, and Z axis is used to apply a uniform coating as a first rear reflective layer which may incorporate either pearlescent flakes or aluminium flakes. The coating is applied to the rear of the polymer layer. Optionally, the robot may also apply a second rear reflective layer on to the first rear reflective layer.

Optionally, the robot may also spray coat a uniform diffusive layer on the front side of the polymer layer of the edge finished screen.

Figure 6:
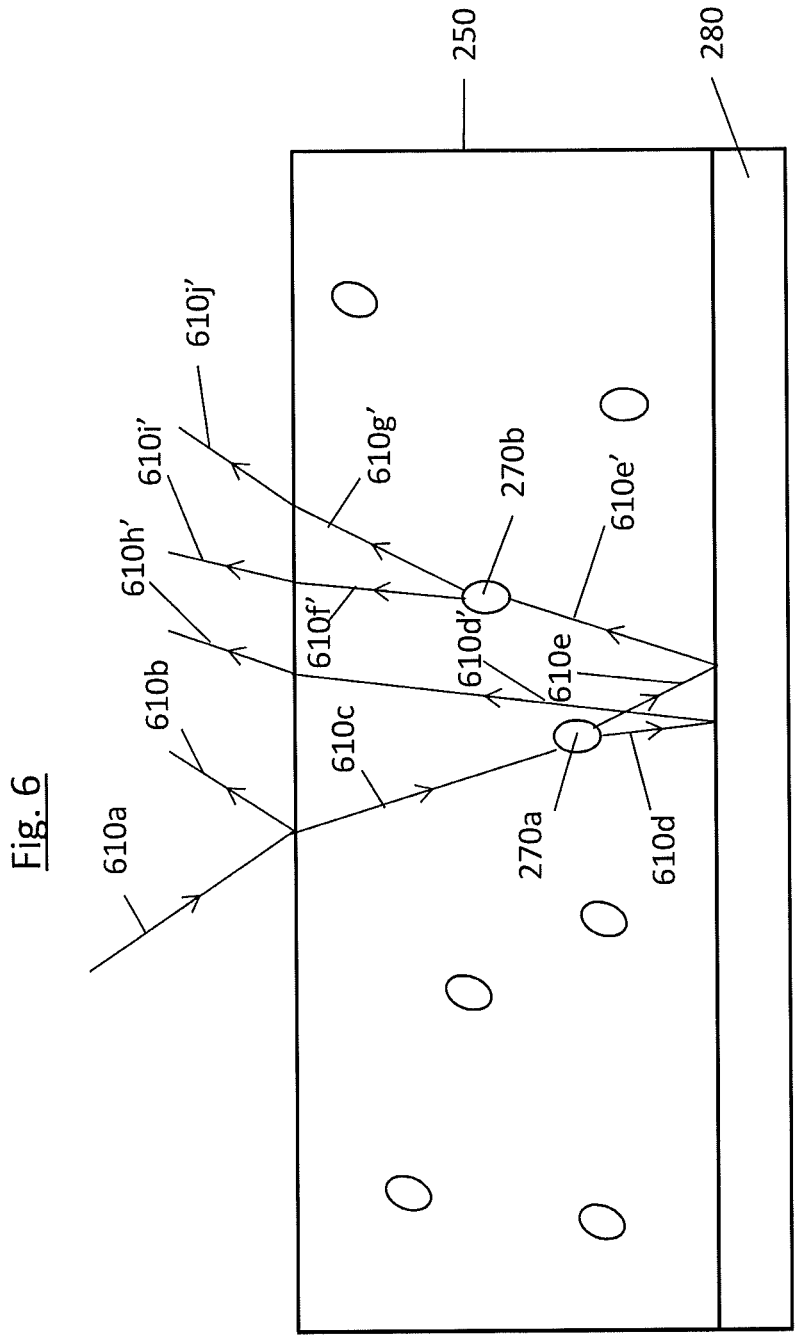
FIG. 6 illustrates a cross sectional view of a front projection screen in accordance with the present disclosure that comprises a polymer layer, a plurality of diffusing particles incorporated into the polymer layer, and a first rear reflective layer.

FIG. 6 shows a cross-sectional view of a front projection screen in accordance with the present disclosure. The projection screen comprises: a polymer layer 250 comprising a front side that faces incoming incident light generated from a projector; a plurality of diffusing particles 270 incorporated into the polymer layer; and a first rear reflective layer 280 arranged on a back side of the polymer layer opposite to the front side.

Incoming light ray 610*a* may be generated from a laser projector. A portion of incoming light ray 610*a* reflects from polymer layer 250 to form reflected light ray 610*b*. A remaining portion of incoming light ray 610*a* is transmitted into the polymer layer 250 to form transmitted light ray 610*c*. Light being transmitted through the polymer layer may fall incident on and be diffusely transmitted, and/or diffusely scattered by one or more diffusing particles.

In this example, transmitted light ray 610*c* falls incident on, and is diffusively transmitted by diffusing particle 270*a* to form diffusively transmitted light 610*d* and 610*e*. Diffusively transmitted light 610*d* and 610*e* may fall incident on, and be partly reflected by first rear reflective layer 280 to form reflected light 610*d*' and 610*e*', respectively.

Reflected light from the first rear reflector may fall incident on and be diffusely transmitted and/or diffusely scattered by one or more diffusing particles when propagating through the polymer layer. In this example, reflected light 610*e*' falls incident on, and is diffusively transmitted by diffusing particle 270*b* to form diffusively transmitted light 610*f*' and 610*g*'. A portion of light 610*d*', 610*f*' and 610 *g*' is transmitted out of the polymer layer and toward the viewer as light 610*h*', 610*i*' and 610*j*' respectively. The phase delay between light 610*h*', 610*i*' and 610*j*' is different due to the different path length differences within the projection screen.

Figure 7:
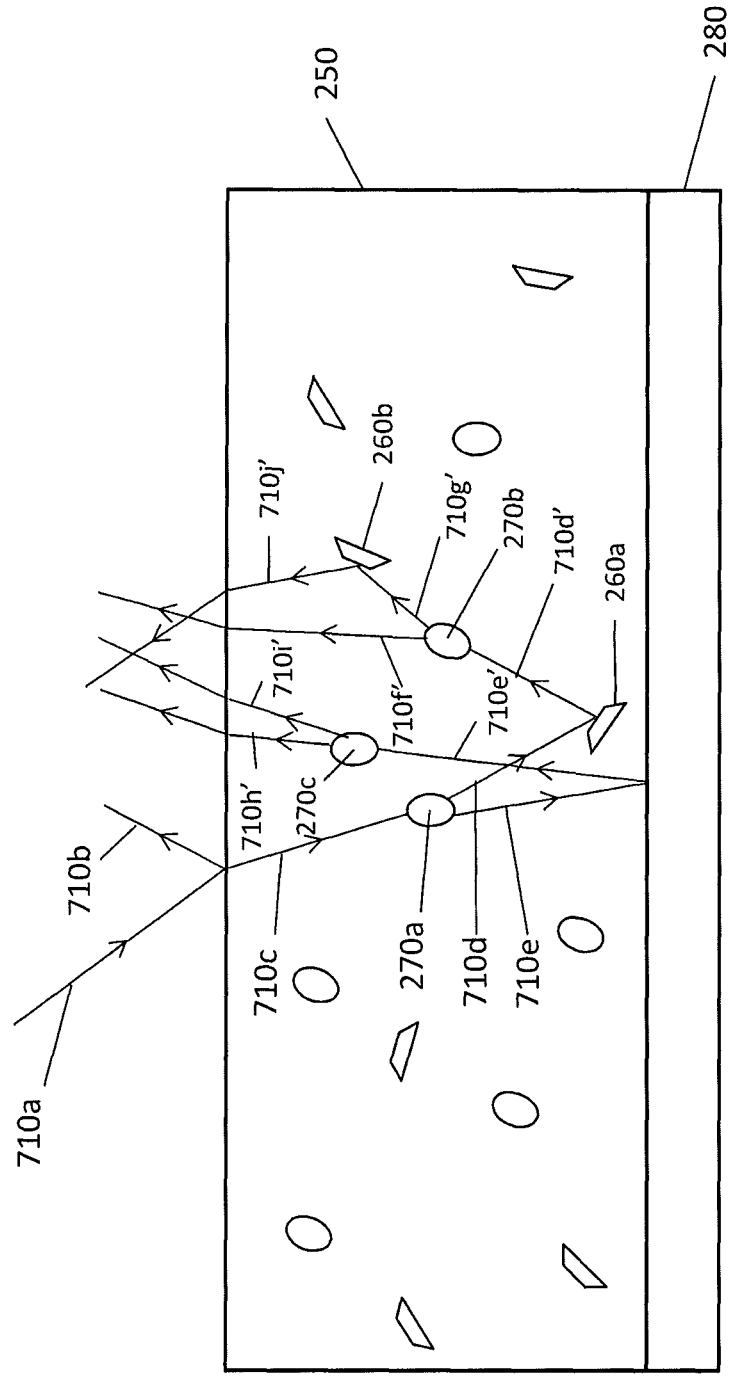
FIG. 7 illustrates a cross sectional view of a front projection screen in accordance with the present disclosure that comprises a polymer layer, a plurality of diffusing particles and reflecting particles incorporated into the polymer layer, and a first rear reflective layer.

FIG. 7 shows a cross-sectional view of the front projection screen of FIG. 6 that further comprises reflecting particles 260 incorporated into the polymer layer.

During operation, incoming light ray 710*a* may be generated from a laser projector. A portion of incoming light ray 710*a* reflects from polymer layer 250 to form reflected light ray 710*b*. A remaining portion of incoming light ray 710*a* is transmitted into the polymer layer 250 to form transmitted light ray 710*c*. Light being transmitted through the polymer layer may fall incident on and be diffusely transmitted, and/or diffusely scattered, by one or more diffusing particles. In addition, light being transmitted through the polymer layer may fall incident on and be reflected by one or more reflecting particles.

In this example, transmitted light ray 710c falls incident on, and is diffusively transmitted by diffusing particle 270a to form diffusively transmitted light 710d and 710e. Diffusively transmitted light 710d falls incident on, and is partly reflected by reflective particle 260a to form reflected light 710d'. Diffusively transmitted light 710e falls incident on, and is partly reflected by first rear reflective layer 280 to form reflected light 710e'.

Light travelling in the forward or backward direction may fall incident on and be diffusely transmitted, and/or diffusely scattered, by one or more diffusing particles when propagating through the polymer layer. Similarly, light travelling in the forward or backward direction may fall incident on and be reflected by one or more reflecting particles when propagating through the polymer layer.

In this example, reflected light 710d' falls incident on, and is diffusively transmitted by diffusing particle 270b to form diffusively transmitted light 710f' and 710g'. Reflected light 710e' falls incident on, and is diffusively transmitted by diffusing particle 270c to form diffusively transmitted light 710h' and 710i'. Diffusively transmitted light 710g' falls incident on and is partly reflected by reflective particle 260b to form reflected light 710j'.

A portion of light 710f', 710g', 710h' and 710j' is transmitted out of the polymer layer and toward the viewer. The phase delay between light 710f', 710g', 710h' and 710j' is different due to the differences in their respective path lengths within the projection screen.

The front projection screens of FIGS. 6 and 7 may further comprise a surface-diffusion layer and/or a second rear reflective layer in accordance with the present disclosure. The surface-diffusion layer may be arranged on the front side of the polymer layer and the second rear reflective layer may be arranged on top of the first rear reflective layer. In this example, light incident on the surface-diffusion layer may be reflected and/or diffused in accordance with the present disclosure. Further, light incident on the second rear reflective layer may be reflected in accordance with the present disclosure.

An example of the projection screen of FIG. 7 further comprising a surface-diffusion layer and second rear reflective layer is illustrated in FIGS. 2 to 5.

Figure 8:
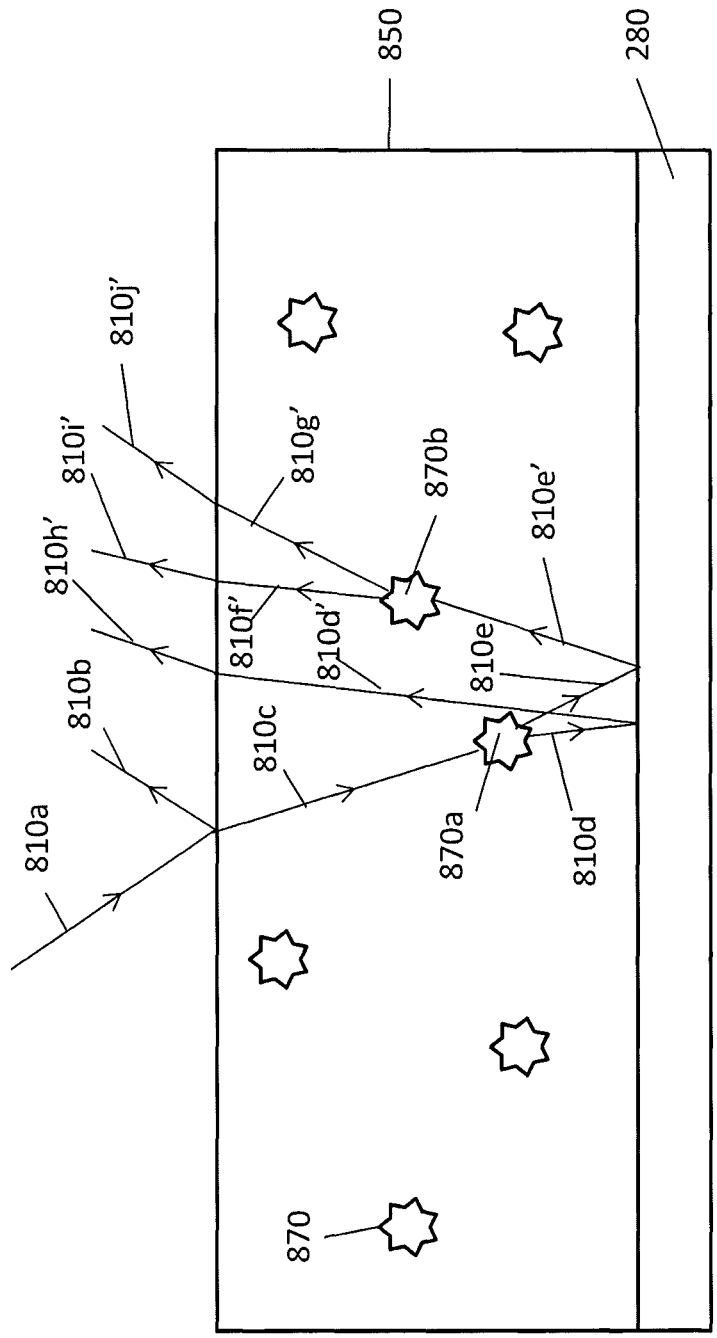
FIG. 8 illustrates a cross sectional view of a front projection screen in accordance with the present disclosure that comprises a polymer layer and a first rear reflective layer.

FIG. 8 shows a cross-sectional view of the front projection screen of FIG. 6 without diffusing particles incorporated into the polymer layer and wherein the polymer layer 850 is formed of an inherently volume-diffusive polymer. In this arrangement the polymer layer is arranged to diffuse incident light via diffusive scattering from scattering centres 870 within the volume diffusive polymer 850. Examples of scattering centres include constituent materials of the polymer layer, voids and other natural inhomogeneities.

Incoming light ray 810a may be generated from a laser projector. A portion of incoming light ray 810a reflects from polymer layer 850 to form reflected light ray 810b. A remaining portion of incoming light ray 810a is transmitted into the polymer layer 850 to form transmitted light ray 810c. Light being transmitted through the polymer layer may fall incident on and be diffusely scattered by one or more scattering centres.

In this example, transmitted light ray 810c falls incident on, and is diffusively scattered by scattering centre 870a to form diffusively scattered light 810d and 810e. Diffusively scattered light 810d and 810e may fall incident on, and be partly reflected by first rear reflective layer 280 to form reflected light 810d' and 810e', respectively.

Reflected light from the first rear reflector may fall incident on and be diffusely scattered by one or more scattering centres when propagating through the polymer layer. In this example, reflected light 810e' falls incident on, and is diffusively scattered by diffusing particle 870b to form diffusively scattered light 810f' and 810g'. A portion of light 810d', 810f' and 810 g' is transmitted out of the polymer layer and toward the viewer as light 810h', 810i' and 810j' respectively. The phase delay between light 810h', 810i' and 810j' is different due to the different path length differences within the projection screen.

As one possibility, one or more diffusive particles may be incorporated into the volume diffusive polymer layer 850 of FIG. 8. In this example, light propagating through the volume diffusive polymer layer may be further diffused by one or more diffusive particles in accordance with the present disclosure.

As a further possibility, one or more reflective particles may be incorporated into the volume diffusive polymer layer 850 of FIG. 8. In this example, light propagating through the volume diffusive polymer layer may be reflected by one or more reflective particles in accordance with the present disclosure.

As a further possibility, the volume diffusive polymer layer 850 of FIG. 8 may further comprise a surface-diffusion layer and/or a second rear reflective layer in accordance with the present disclosure. The surface-diffusion layer may be arranged on the front side of the polymer layer and the second rear reflective layer may be arranged on top of the first rear reflective layer. In this example, light incident on the surface-diffusion layer may be reflected and/or diffused in accordance with the present disclosure. Further, light incident on the second rear reflective layer may be reflected in accordance with the present disclosure.

The invention claimed is:

1. A laser projection screen comprising:
   a polymer substrate layer adapted to provide sufficient structural integrity for mounting the laser projection screen onto a frame, the polymer substrate layer comprising a front side that faces incoming incident light generated from a projector;
   a first rear reflective layer arranged on a back side of the polymer substrate layer opposite to the front side, wherein the first rear reflective layer is a coating applied to the back side of the polymer substrate layer;
   a plurality of diffusing particles incorporated into the polymer substrate layer, wherein the diffusing particles are distributed throughout the polymer substrate layer; and
   a surface-diffusion layer arranged on the front side of the polymer substrate layer, and wherein the surface-diffusion layer is a textured diffusive surface; and
   a second rear reflective layer arranged on top of the first rear reflective layer.

2. The projection screen of claim 1 wherein the polymer substrate layer is a volume diffusing polymer.

3. The projection screen of claim 1 further comprising: a plurality of reflecting particles incorporated into the polymer substrate layer.

4. The projection screen of claim 3 wherein the reflecting particles are distributed throughout the polymer substrate layer and/or partially randomly tilted.

5. The projection screen of claim 3 wherein the combined percentage by weight of diffusing particles and reflecting particles in the polymer substrate layer comprises 0% to 10%.

6. The projection screen of claim 3 wherein the plurality of diffusing particles comprise at least one or more of: Barium Sulphate; Antimony Trioxide; Aluminium Trihydrate; Titanium Dioxide; Calcium Carbonate; or Magnesium Carbonate, and wherein the plurality of reflecting particles comprise at least one or more of: pearlescent flakes; or aluminium flakes, optionally with an outer coating configured to prevent oxidation of the aluminium flake.

7. The projection screen of claim 3 wherein the diffusing particles and reflecting particles are a particle configured to diffuse a portion of incident light and reflect a portion of incident light.

8. The projection screen of claim 1 wherein light incident on at least one of the plurality of diffusing particles comprises at least one of: incoming light generated from a projector; reflected light from at least one of a plurality of reflecting particles; and reflected light from the first rear reflective layer.

9. The projection screen of claim 1 wherein the polymer substrate layer comprises a calendered PVC with a plasticiser, preferably 100 to 600 microns thick, and wherein the polymer layer has a surface gloss of 3% to 15%.

10. The projection screen of claim 1 wherein the surface-diffusion layer comprises a coating comprising a matting agent, and wherein the coating is a silica coating.

11. The projection screen of claim 1 wherein the surface-diffusion layer is formed by embossing the surface of the polymer substrate layer that it is arranged on.

12. The projection screen of claim 1 wherein the surface-diffusion layer is formed by roughening the front surface of the polymer substrate layer.

13. The projection screen of claim 1 wherein the surface-diffusion layer has a surface gloss of less than 5%.

14. The projection screen of claim 1 wherein the first rear reflective layer comprises a partially reflective layer having a first reflectance less than 100%, optionally, comprising pearlescent flakes, and wherein the first rear reflective layer is a specular reflective surface.

15. The projection screen of claim 1 wherein the first rear reflective layer comprises: a spray coated clear polymer resin comprising pearlescent flakes; or a laminate of polyvinyl chloride (PVC) comprising pearlescent flakes that is heat bonded to the polymer layer during calendering.

16. The projection screen of claim 1 wherein the second rear reflective layer has a second reflectance, greater than the first reflectance, optionally, wherein the second reflectance is 100%, and wherein the second rear reflective layer is a diffusive reflective surface.

17. The projection screen of claim 1 wherein the second rear reflective layer comprises a spray coated clear polymer resin comprising Titanium Dioxide or white filler, and wherein at least one of the polymer layer, first rear reflective layer, and second rear reflective layer further comprise one or more Aluminium flakes.

18. The laser projection screen according to claim 1, wherein the polymer substrate layer has a thickness, the first rear reflective layer has a thickness, and the thickness of the polymer substrate layer is greater than the thickness of the first rear reflective layer.

19. A laser projection system comprising:
a laser projection screen comprising:
a polymer substrate layer adapted to provide sufficient structural integrity for mounting the laser projection screen onto a frame, the polymer substrate layer comprising a front side that faces incoming incident light generated from a projector;
a first rear reflective layer arranged on a back side of the polymer substrate layer opposite to the front side, wherein the first rear reflective layer is a coating applied to the back side of the polymer substrate layer;
a plurality of diffusing particles incorporated into the polymer substrate layer, wherein the diffusing particles are distributed throughout the polymer substrate layer;
a surface-diffusion layer arranged on the front side of the polymer substrate layer, and wherein the surface-diffusion layer is a textured diffusive surface; and
a second rear reflective layer arranged on top of the first rear reflective layer; and
a laser projector that emits light toward the laser projection screen.

* * * * *